Jan. 1, 1929.
J. W. COX
1,697,049
FUEL FEEDING DEVICE
Filed Feb. 6, 1925
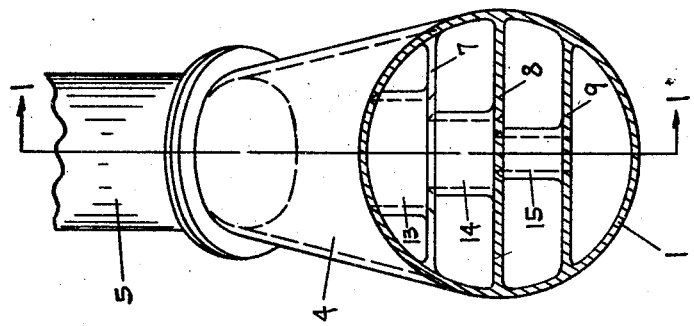
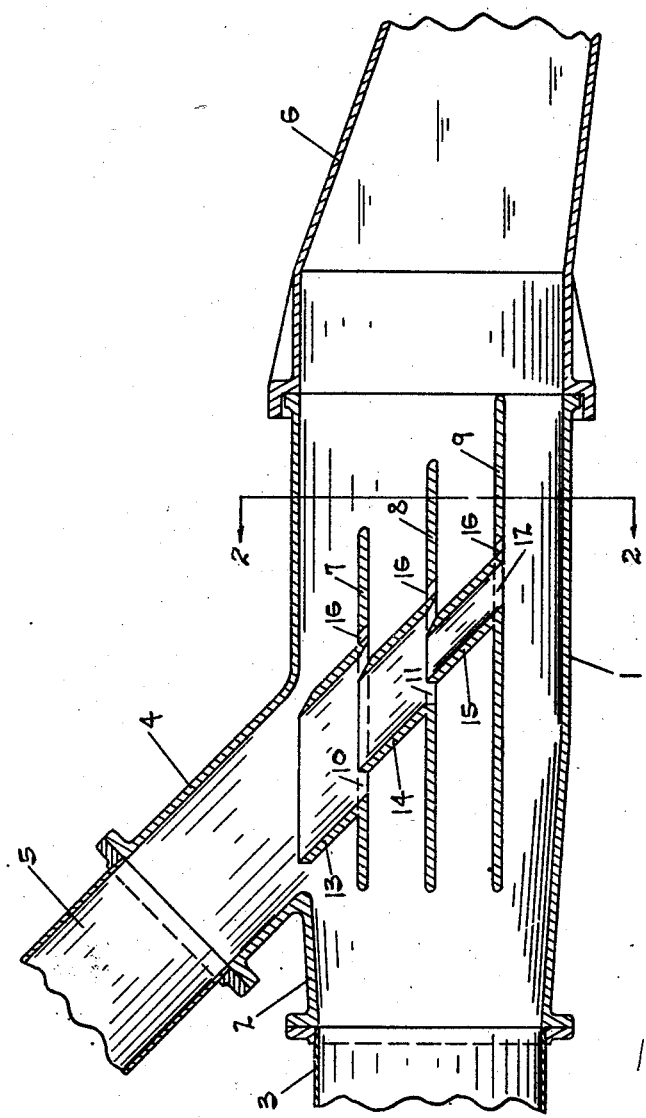
Inventor
John W. Cox
By
Attorney Patented Jan. 1, 1929.

UNITED STATES PATENT OFFICE.

JOHN W. COX, OF ERIE, PENNSYLVANIA, ASSIGNOR OF ONE-FOURTH TO GEORGE R. METCALF AND ONE-FOURTH TO EDWARD E. WALKER, BOTH OF ERIE, PENNSYLVANIA.

FUEL-FEEDING DEVICE.

Application filed February 6, 1925. Serial No. 7,342.

This device is particularly designed for feeding fuel in that type of device in which the fuel, usually formed of fine coal dust, is delivered to the furnace with air, the fuel delivery air being insufficient for combustion and a supplemental supply of air being delivered to the mixture of air and fuel to supplement the conveying air. With such devices it is desirable that the supplemental air shall be thoroughly mixed with the mixture so that the combustion may be more rapid and thorough. The present invention is designed to accomplish this in a simple and efficient manner. Details and features of the invention will appear from the specification and claims.

The invention is illustrated in the accompanying drawings as follows:—

Fig. 1 shows a central vertical section of the device on the line 1—1 in Fig. 2.

Fig. 2 a section on the line 2—2 in Fig. 1.

1 marks a fuel conduit having the air inlet branch 2 leading from the supplemental air supply 3 and a fuel supplying branch 4 leading from a fuel delivery pipe 5. A nozzle 6 is secured to the front end of the conduit 1 and ordinarily extends directly into the furnace. A series of plates 7, 8 and 9 are arranged within the conduit 1 and extend longitudinally thereof and preferably from side wall to side wall. Openings 10, 11 and 12 are arranged in the plates, these being arranged in alinement with the branch 4 and stepped down in size, the larger being adjacent to the supply. Tubes 13, 14 and 15 extend from the plates toward the supply and surround the openings 10, 11 and 12. The over-rich mixture, fuel and air, entering from the supply branch 4 is divided up by this arrangement. The mixture nearer the outer walls of the branch 4 passes outside of the tube 13 and is deflected by the plate 7 and at the same time is supplemented by the air passing through the supply branch above the plate 7 so that this part of the mixture gets its quota of air. Similarly the air entering at the wall of the tube 13 and outside of the diameter of the tube 14 passes through the opening 10 outside the wall 14 and is deflected by the plate 8. Similarly the outer wall of mixture next the tube 14 passes through the opening 11 outside of the wall 15 and is deflected by the plate 9. The final core, as it were, of the incoming mixture passes through the tube 15 and opening 12 and is carried through the lower part of the pipe 1 with the incoming air. It will be noted that the plates, therefore, divide the incoming air up into a number of streams and that an equalized portion of the mixture is delivered to each stream so that the tendency for the streams coming from the two branches to stratify is obviated. Small openings 16 are preferably arranged at the front sides of the tubes to prevent the accumulation of fuel in the eddy formed by the air passing around the tubes 13, 14 and 15.

What I claim as new is:—

1. In a fuel feeding device, the combination of a conduit; distributor plates arranged within the conduit and extending longitudinally thereof, said plates having openings in alinement with each other; and means for supplying supplemental air and a mixture of air and fuel to the conduit, one directly into the conduit in line with the plates and the other in line with the openings.

2. In a fuel feeding device, the combination of a conduit; distributor plates arranged within the conduit and extending longitudinally thereof, said plates having openings in alinement with each other; and means for supplying supplemental air and a mixture of air and fuel to the conduit, the mixture in line with the openings and the air in line with the plates.

3. In a fuel feeding device, the combination of a conduit having Y branches thereon; distributor plates arranged in the conduit and extending longitudinally thereof, said plates having openings in alinement with each other and with one of the branches from the conduit; and means supplying air to one branch and air and fuel to the other branch of the conduit.

4. In a fuel feeding device, the combination of a conduit; distributor plates arranged within the conduit and extending longitudinally thereof, said plates having openings; and means for supplying supplemental air and a mixture of air and fuel to the conduit, one directly into the conduit in line with the plates and the other in line with the openings, the openings being stepped down in size with the one nearer the supply the larger.

5. In a fuel feeding device, the combination of a conduit; distributor plates arranged within the conduit and extending longitudinally thereof, said plates having openings;

means for supplying supplemental air and a mixture of air and fuel to the conduit; one directly into the conduit in line with the plates and the other in line with the openings, the openings being stepped down in size with the one nearer the supply the larger; and tubes surrounding the openings and extending from the plates toward the supply.

6. In a fuel feeding device, the combinatin of a conduit having Y branches thereon; distributor plates arranged within the conduit and extending longitudinally thereof, said plates having openings in alinement with one of the branches, said openings being stepped down in size, the larger opening being nearer the branch; and tubes surrounding the openings and extending from the plates toward the branch with which the openings are in line.

In testimony whereof I have hereunto set my hand.

JOHN W. COX